March 16, 1943.  F. H. MUELLER ET AL  2,314,014
DRILLING APPARATUS
Filed Jan. 31, 1942

Inventors:
Frank H. Mueller,
Walter J. Bowan,
By Cushman Darby & Cushman
Attorneys.

Patented Mar. 16, 1943

2,314,014

UNITED STATES PATENT OFFICE 2,314,014

DRILLING APPARATUS

Frank H. Mueller and Walter J. Bowan, Decatur, Ill., assignors to Mueller Co., Decatur, Ill., a corporation of Illinois Application January 31, 1942, Serial No. 429,092

6 Claims. (Cl. 77—40)

This invention relates to drilling apparatus of the type used in drilling, tapping and equipping mains containing fluid under pressure.

Apparatus of this type comprises a barrel adapted to be sealed against the main at one end and closed at its other end by means of a threaded cap. The cap includes an externally threaded neck in which the boring bar is guided and a nut threaded on the neck is connectible with the boring bar in order to advance the same to the work, the nut being equipped with handles by means of which it may be readily turned. The operations of drilling, tapping and equipping require that the cap, and therewith the boring bar, be removed at certain points in order that the boring bar may be equipped with tools appropriate to the different operations. An object of the present invention is to enable the same handles which are used in turning the nut to be used in threading the cap on and off of the barrel. The invention is shown in practical and preferred embodiment in the accompanying drawing with reference to which the description will proceed.

Figure 1:
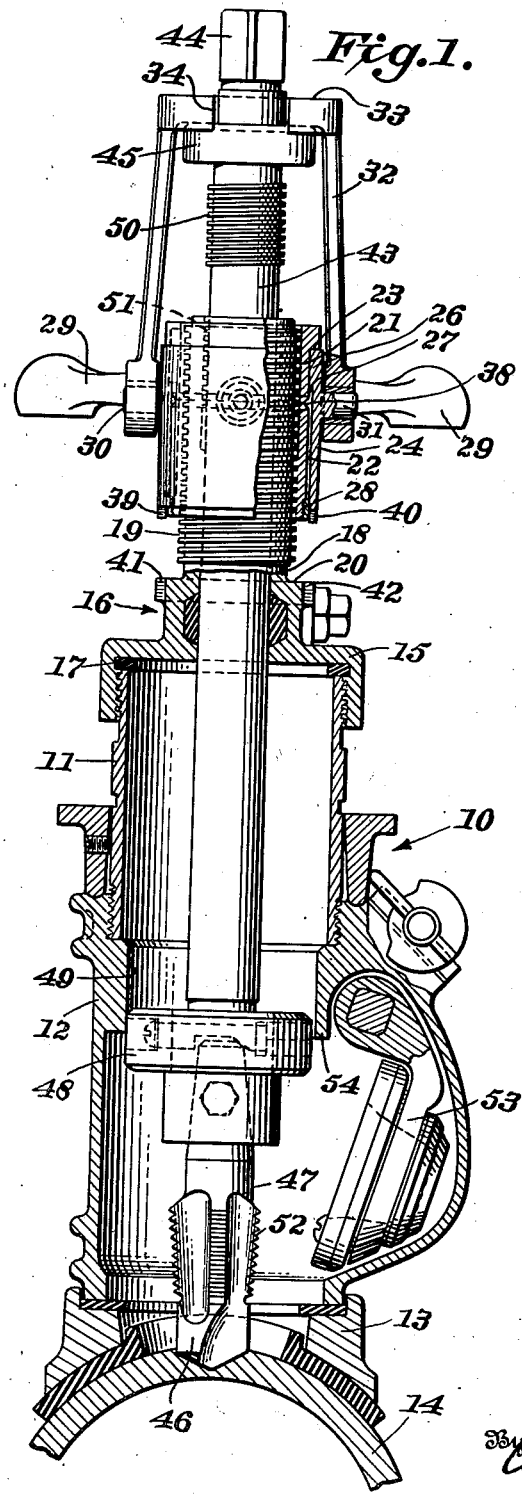
Figure 1 is an axial section of drilling equipment in accordance with the invention, a main with which the apparatus is associated being shown in partial transverse section.

Referring to the drawing, reference numeral 10 designates generally a barrel here shown as comprising an upper or outer portion 11 threaded into a lower or inner portion 12, the latter being sealed against a saddle 13 and the saddle being sealed against the main 14 around the point where the main is to be drilled, tapped and equipped. The barrel is held in operative relationship to the main by chains or straps in the well-known manner.

The upper end of barrel portion 11 is provided with external threads which are shown as engaged by internal threads of the base portion 15 of a cap 16, the base portion being sealed against the barrel portion through a gasket 17 which is tightly compressed to provide a fluid-tight joint. The cap 16 includes a neck 18 projecting coaxially from the base 15 and provided with external threads 19. At the lower end of neck 18 is a shoulder 20.

Engaged with the threads 19 is a nut 21 which has a cylindrical external portion 22 surmounted by an annular shoulder 23. A collar 24 embraces portion 22 of nut 21 and is slidable thereon but prevented from relative rotation by a spline 25 which is fixed in a longitudinal groove of the nut and is slidably received in a groove of the collar. The upper portion of the collar at 26 has a close sliding fit with the nut but below this portion the bore of the collar is slightly enlarged so that an annular shoulder 27 is provided. The lower end of the nut is reduced and has threaded thereon a ring 28 which has a close sliding fit in the enlarged bore portion of the collar. Thus, the collar is slidable on the nut between an upper position wherein the upper edge of the collar engages the shoulder 23 and a lower position in which the shoulder 27 engages the ring 28.

Projecting from the collar 24 are four radial arms 29 by which the collar, and therewith the nut, may be turned. Pivoted on diametrically opposite trunnions 30 and 31 which project from the collar are the arms of a yoke 32 which includes a cross portion 33 having a recess 34 which is laterally directed when the yoke is in the upright position shown in Figure 1. A radial boss 35 on the collar houses a detent 36 which is urged inwardly by a compression spring 37, the detent being adapted to engage in a V-section groove 38 of nut 21 so as to releasably maintain the relation of parts shown in Figure 1 wherein the upper edge of the collar is against, or substantially against, shoulder 23. The force of spring 37 is such that this relationship will be maintained against the weight of the nut and the associated yoke 32.

Collar 24 is provided at its lower edge with two opposite downwardly projecting square lugs 39 and 40 which are receivable in mating recesses 41 and 42 in shoulder 20.

Reference numeral 43 designates a boring bar which is slidable and rotatable in an axial bore of neck 18. The upper extremity 44 of the bar is squared for the reception of a suitable turning tool and beneath this portion the bar is provided with a fixed circular abutment 45. In the relation of parts shown in Figure 1, the cross portion 33 of the yoke overlies abutment 45, the portion of the bar just above the abutment being received in the recess 34. Upon manipulation of the handles 29 to thread the nut 21 downwardly on the neck 18 shoulder 23 forces collar 24 to follow, and through yoke 32 the boring bar will be advanced, thus engaging the drill portion 46 of a tool 47, secured in a socket in the lower end of the bar, with the main 14. In the illustrated embodiment a centering disc 48 on the boring bar cooperates with a cylindrical guide surface 49 of the barrel to center the bit, but this feature forms no part of the present invention. Also, as here shown, the boring bar is provided with threads 50 which at the end of the drilling operation come into engagement with internal threads 51 at the upper end of neck 18. Yoke 32 can then be disengaged from the bar, since rotation of the latter will cause it to be advanced in accordance with the pitch of a tap portion 52 of tool 47. This feature also forms no part of the present invention, although preferred.

Figure 2:
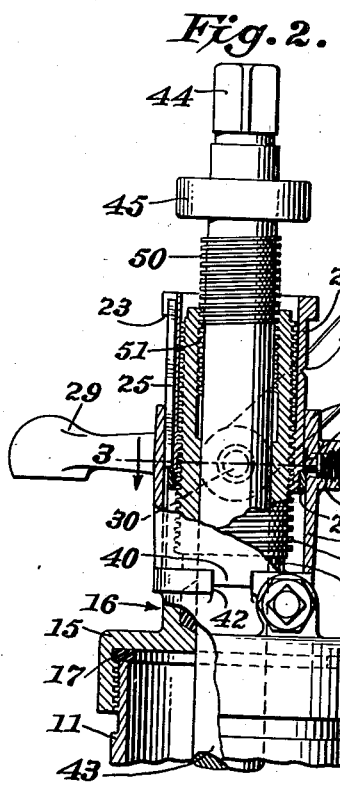
Figure 2 is a partial axial section of the apparatus of Figure 1 showing certain parts in a different relationship.
Figure 3:
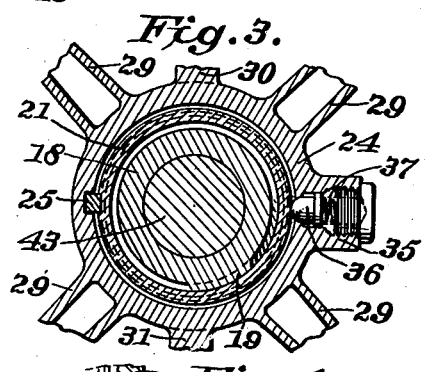
Figure 3 is a section on line 3—3 of Figure 2.
Figure 4:
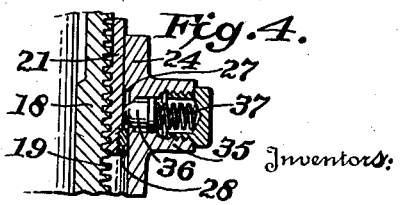
Figure 4 is a somewhat enlarged section of a detail.

In any event, after the main has been drilled and tapped, it is necessary to remove the cap 16 and boring bar from the barrel in order that the bar may be equipped with a stop inserting tool, such, for example, as is shown in Patent No. 2,247,427, granted July 1, 1941, to ourselves and Elmer H. Fawley. The lower end of the boring bar, together with the tool, is pulled into the upper portion of the barrel and then a flop 53 is swung against a seat 54 so that the barrel portion above the seat is sealed off from the main pressure. By pulling downwardly on arms 29, yoke 32 having been disengaged from the boring bar, collar 24 is now slid downwardly relative to nut 21 so as to engage lugs 39 and 40 in recesses 41 and 42 in the manner shown in Figure 2. By manipulation of arms 29 the cap can now be readily threaded off, the stop inserting tool substituted, and the cap again threaded on, the lugs and recesses constituting clutch means operative to transmit rotation of collar 24 in either direction to the cap. The flop valve is now swung away from the seat, the stop inserted in the usual manner, and the drilling machine can then be removed for use elsewhere.

Under some circumstances the nut 21 might be so high up on neck 18 that upon sliding collar 24 downwardly relatively to the nut, shoulder 27 would strike abutment 28 before lugs 39 and 40 could reach recesses 41 and 42. However, it is only necessary in such case to spin the nut a few times in order to bring the lugs into the range of the recesses. In the absence of the stop 28 some inconvenience would be occasioned, in the situation just mentioned, since the collar could pass completely below the nut and time would be lost in bringing the parts again into normal association.

While we have described a preferred embodiment of the invention, it will be understood that we do not limit ourselves to the disclosed details of form and arrangement of parts. Variations in such particulars are contemplated under the following claims.

We claim:

1. Drilling apparatus comprising a cap including a base having means for engaging the barrel of a drilling machine upon turning of the base relative to the barrel, said means disengaging the barrel upon reverse turning of the base, said cap including an externally threaded neck projecting coaxially from said base and having an axial bore, a boring bar rotatable and reciprocable in said bore, a nut threaded on said neck, a collar non-rotatably but axially slidably mounted on said nut, an arm projecting from the collar by which the latter may be turned to traverse the nut, cooperating abutment portions on the nut and collar whereby the collar is caused to follow the nut when the nut is threaded toward the base, means whereby the boring bar may be caused to follow the collar as the collar is moved toward the base, and clutch means on said collar and cap engageable to transmit turning movement of the collar to the cap in either direction when the collar is slid relative to said nut toward said base.

2. Drilling apparatus comprising a cap including a base having means for engaging the barrel of a drilling machine upon turning of the base relative to the barrel, said means disengaging the barrel upon reverse turning of the base, said cap including an externally threaded neck projecting coaxially from said base and having an axial bore, a boring bar rotatable and reciprocable in said bore, a nut threaded on said neck, a collar non-rotatably but axially slidably mounted on said nut, an arm projecting from the collar by which the latter may be turned to traverse the nut, cooperating abutment portions on the nut and collar whereby the collar is caused to follow the nut when the nut is threaded toward the base, means whereby the boring bar may be caused to follow the collar as the collar is moved toward the base, and interlocking formations on the cap and on the end of said collar toward said base, said formations being engageable to transmit turning movement of the collar to the cap in either direction when the collar is slid relative to said nut toward said base.

3. Drilling apparatus comprising a cap including a base having means for engaging the barrel of a drilling machine upon turning of the base relative to the barrel, said means disengaging the barrel upon reverse turning of the base, said cap including an externally threaded neck projecting coaxially from said base and having an axial bore, a boring bar rotatable and reciprocable in said bore, a nut threaded on said neck, a collar non-rotatably but axially slidably mounted on said nut, an arm projecting from the collar by which the latter may be turned to traverse the nut, cooperating abutment portions on the nut and collar whereby the collar is caused to follow the nut when the nut is threaded toward the base, means whereby the boring bar may be caused to follow the collar as the collar is moved toward the base, clutch means on said collar and cap engageable to transmit turning movement of the collar to the cap in either direction when the collar is slid relative to said nut toward said base, and means limiting the sliding range of said collar toward said base relative to said nut.

4. Drilling apparatus comprising a cap including a base having means for engaging the barrel of a drilling machine upon turning of the base relative to the barrel, said means disengaging the barrel upon reverse turning of the base, said cap including an externally threaded neck projecting coaxially from said base and having an axial bore, a boring bar rotatable and reciprocable in said bore, a nut threaded on said neck, a collar non-rotatably but axially slidably mounted on said nut, an arm projecting from the collar by which the latter may be turned to traverse the nut, cooperating abutment portions on the nut and collar whereby the collar is caused to follow the nut when the nut is threaded toward the base, detent means between the collar and nut whereby said abutment portions are normally maintained in cooperative relation, means whereby the boring bar may be caused to follow the collar as the collar is moved toward the base, and clutch means on said collar and cap engageable to transmit turning movement of the collar to the cap in either direction when the collar is slid relative to said nut toward said base.

5. Drilling apparatus comprising a cap including a base having means for engaging the barrel of a drilling machine upon turning of the base relative to the barrel, said means disengaging the barrel upon reverse turning of the base, said cap including an externally threaded neck projecting coaxially from said base and having an axial bore, a boring bar rotatable and reciprocable in said bore, a nut threaded on said neck, a collar non-rotatably but axially slidably mounted on said nut, an arm projecting from the collar by which the latter may be turned to traverse the nut, a shoulder at the end of said nut remote from the base engageable with the adjacent end of said collar whereby the collar is forced to follow the nut when the nut is threaded toward the base, an abutment on the nut at its other end within the collar and an internal abutment on said collar, said abutments being cooperable to limit sliding movement of the collar relative to the nut away from said shoulder, means whereby the boring bar may be caused to follow the collar as the collar is moved toward the base, and clutch means on said collar and cap engageable to transmit turning movement of the collar to the cap in either direction when the collar is slid relative to said nut toward said base.

6. Drilling apparatus comprising a cap including a base having means for engaging the barrel of a drilling machine upon turning of the base relative to the barrel, said means disengaging the barrel upon reverse turning of the base, said cap including an externally threaded neck projecting coaxially from said base and having an axial bore, a boring bar rotatable and reciprocable in said bore, a nut threaded on said neck, a collar non-rotatably but axially slidably mounted on said nut, an arm projecting from the collar by which the latter may be turned to traverse the nut, a shoulder at the end of said nut remote from the base engageable with the adjacent end of said collar whereby the collar is forced to follow the nut when the nut is threaded toward the base, an abutment on the nut at its other end within the collar and an internal abutment on said collar, said abutments being cooperable to limit sliding movement of the collar relative to the nut away from said shoulder, detent means between the collar and nut whereby said collar is normally maintained against said shoulder, means whereby the boring bar may be caused to follow the collar as the collar is moved toward the base, and clutch means on said collar and cap engageable to transmit turning movement of the collar to the cap in either direction when the collar is slid relative to said nut toward said base.

FRANK H. MUELLER.
WALTER J. BOWAN.